Nov. 17, 1925.
R. P. NICHOLS
1,561,659
COAL TEMPERATURE INDICATOR
Filed Jan. 24, 1921    2 Sheets-Sheet 1
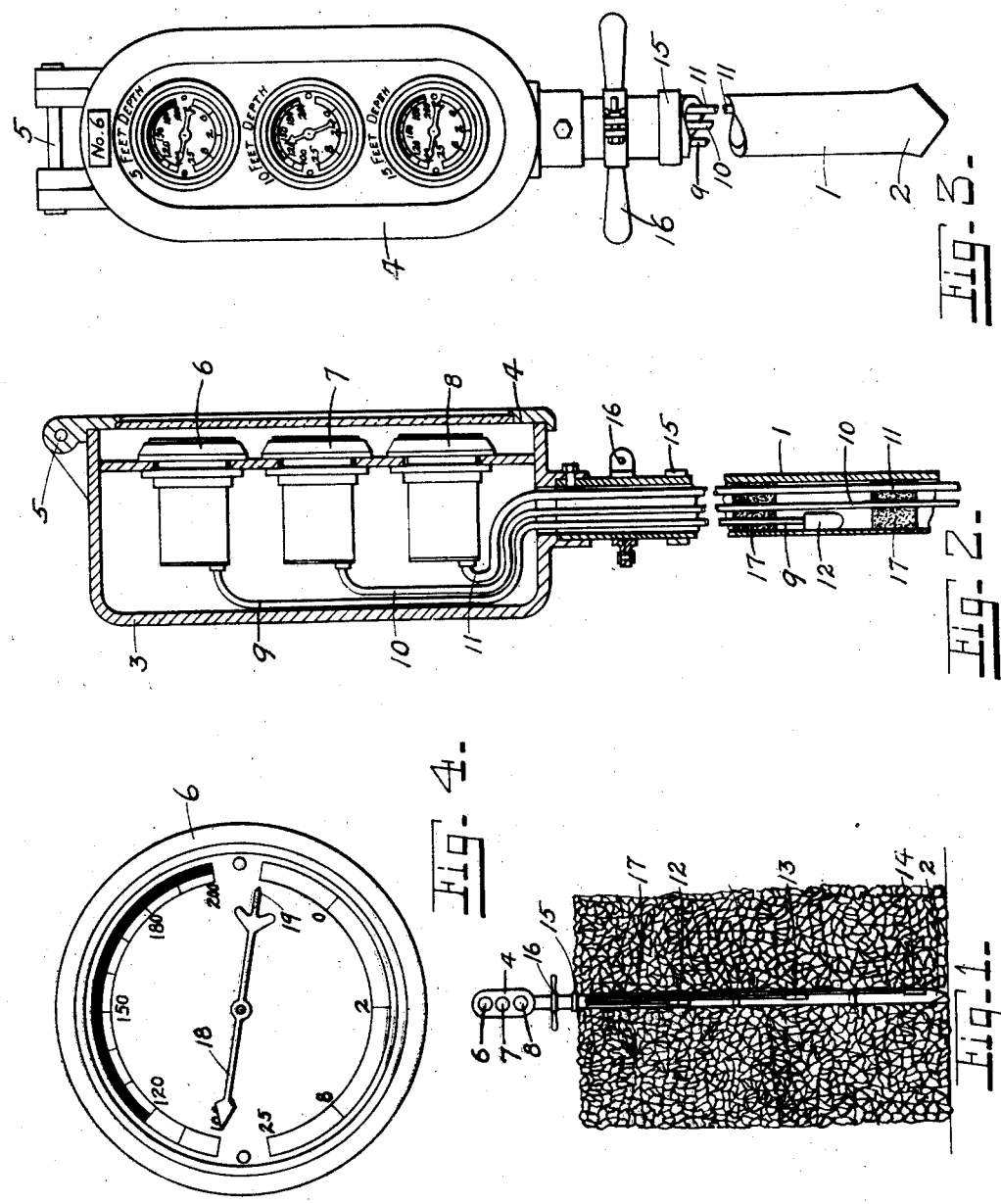

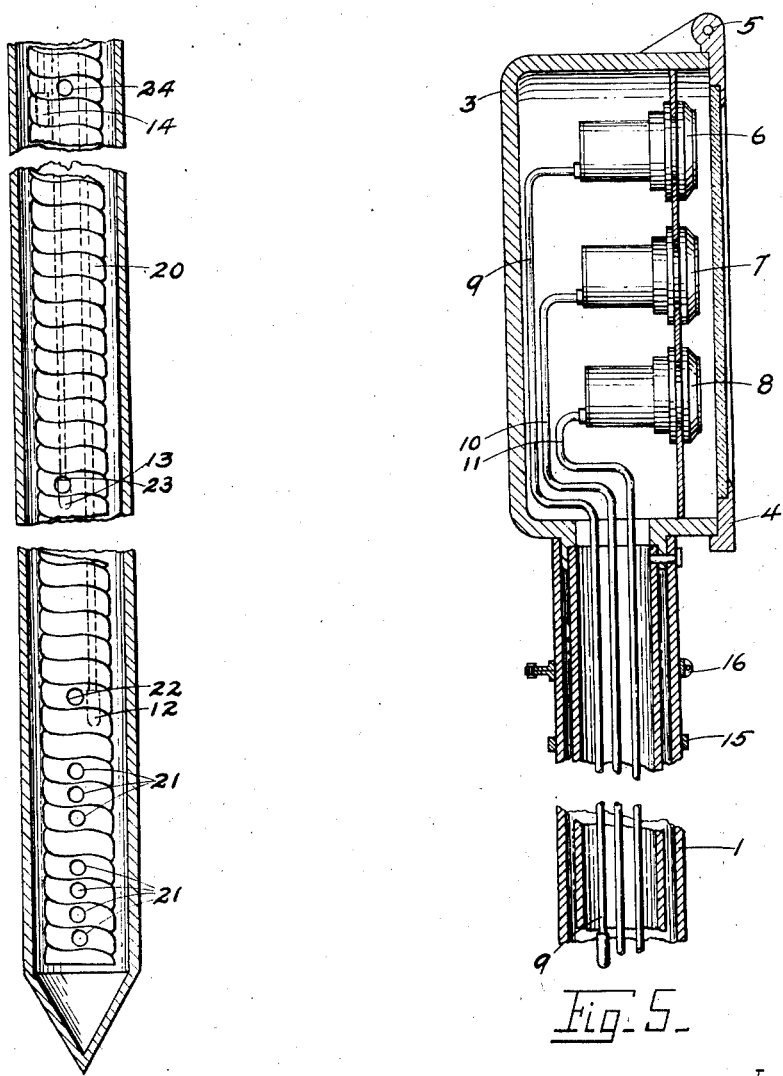

Patented Nov. 17, 1925.

1,561,659

UNITED STATES PATENT OFFICE.

ROBERT P. NICHOLS, OF NEW ROCHELLE, NEW YORK, ASSIGNOR TO FEDERATED ENGINEERS DEVELOPMENT CORPORATION, OF JERSEY CITY, NEW JERSEY, A CORPORATION OF DELAWARE.

COAL-TEMPERATURE INDICATOR.

Application filed January 24, 1921. Serial No. 439,444.

*To all whom it may concern:*

Be it known that I, ROBERT P. NICHOLS, a citizen of the United States, residing at New Rochelle, in the county of Westchester and State of New York, have invented certain new and useful Improvements in Coal-Temperature Indicators; and I do hereby declare the following to be a full, clear, and exact description of the same, reference being had to the accompanying drawings, forming part of this specification.

This invention relates to instruments for visibly and accurately indicating at any convenient place on the exterior of a mass of coal, the temperature at a plurality of locations or points within the mass.

One object of the invention is to provide an instrument that will indicate the temperature existing at a number of points within the mass and will definitely determine the particular points where the temperature has reached a point where spontaneous combustion is likely to occur.

The instrument forming the subject matter of the present invention is also made portable and the expense of maintaining a means for guarding against serious loss or trouble, due to spontaneous combustion, is reduced to a comparatively low figure.

A further object is to provide means for indicating any loss in heating value sustained by the coal subjected to a rise in temperature.

In the accompanying drawings:

Figure 1 is a vertical sectional view showing the instrument inserted in a mass of coal;

Fig. 2 is a sectional view of one end of the instrument;

Fig. 3 is a front elevation of the instrument, the intermediate portion of the casing being omitted;

Fig. 4 is a detail view of one of the pressure gage dials; and,

Figs. 5 and 6 are sectional views of a modified form of instrument.

The instrument comprises a casing 1 of any desired material, the essential requirement being that the material be a relatively good conductor of heat. One end of said casing is formed with a drill point 2 to facilitate the insertion of the casing into the mass of coal. Secured to the other end of casing 1 is a housing 3 provided with a glass inserted cover 4 hinged at its upper edge on pins 5 in the housing.

Located within the housing 3 is a series of temperature indicators, three pressure gages 6, 7 and 8 being shown in the accompanying drawings. The upper portion of the indicating dial of each gage is calibrated for the Fahrenheit scale and the lower portion of each dial is provided with graduations for indicating the percentage of loss in heating units sustained by the coal after subjection to a temperature above normal. Each indicator has the usual pointer or index, one end 18 thereof being adapted to cooperate with the temperature graduations, while the opposite end 19 cooperates with the graduations for determining the loss in heating effect sustained by the coal. The heating value or units of the coal being known originally, and it also being known what heating units or value is lost by the coal when subjected to certain temperatures above normal, the graduations for pointer 19 are so arranged with respect to those for pointer 18 that as certain temperatures above normal are indicated by pointer 18 the corresponding loss in heat units is indicated by pointer 19.

Communicating with the temperature indicators 6, 7 and 8 is a corresponding number of tubes 9, 10 and 11 of comparatively small cross-sectional area, each tube communicating with but one of said gages.

Tubes 9, 10, 11 extend downwardly into casing 1 and terminate in small containers 12, 13 and 14, preferably in the form of bulbs formed on the ends of the tubes and each of said containers is filled with any suitable substance that will generate gas when subjected to temperature above 100° F., such for example, as ammonium salts which will give off gas when subjected to heat, the amount of gas given off being proportionate to the rise in temperature.

The mode of operation of the instrument is apparent. The casing is inserted in the mass of coal, this operation being facilitated by the pointed end 2 and a handle 16 adjacent housing 3 and if any portions of the coal in proximity to the casing are overheated, the heat will be transmitted to one or more of the containers within the casing by conduction and convection. Gas will be generated from the salts in said containers, the amount depending upon the degree of heat, and the pressure of the generated gas will be transmitted to the indicators and the index or pointer of the indicators caused to indicate on the dials the temperature within the mass.

In order that a heated zone in the mass will practically affect only one bulb, if the zone is close to that bulb, the casing is partitioned off into compartments by plugs 17 of asbestos or some other non-conductor of heat, thus preventing convection currents created in the casing affecting all the bulbs. The insulating partitions 17 do not, however, totally prevent the generation of gas in the other bulbs as some heat will be conducted by the casing to the compartment next adjacent the heated zone, this being particularly true when the heated zone within the mass is intermediate two compartments, that is, when the zone is adjacent one of the plugs 17. Any desired number of indicators, tubes and containers might be used but only three have been illustrated in the accompanying drawings and in the form of instrument shown the three bulbs 12, 13 and 14 are adapted to be located five, ten and fifteen feet, respectively, below a depth indicating ring 15 secured on the exterior casing 1. When a plurality of indicators are employed, a heated zone that may happen to exist at a point intermediate two of the bulbs can be readily and rather accurately located by the fact that two of the bulbs, and consequently two of the indicators will be affected. If both indicators are affected to the same extent it is known that the heated zone is located approximately half way between the two bulbs and if the effect created upon one indicator is greater than that produced upon the other it is apparent that the heated zone in the mass is nearer the bulb generating the greatest pressure.

In the modified form of instrument illustrated in Figs. 5 and 6, the containers and tubes within the casing are enclosed within a flexible metallic tube 20, provided with a series of apertures 21 adjacent its lower end and additional apertures 22, 23 and 24, one adjacent each of the containers 12, 13 and 14. As shown, the heat insulating partitions may be omitted, and in this event all three bulbs will be affected regardless of the locality of the heated zone within the mass. The bulb nearest the heated zone will, of course, be affected to the greatest extent and the bulb farthest away from the zone will be affected the least by comparing the readings of the several dials of the indicators the approximate location of the heated zone can be determined.

In this form of device the apertures in the tube 20 permit the free circulation of convection currents which, together with the heat conducting properties of the tube and casing insures efficient functioning of the instrument.

The capillary tubes are greatly shortened and this is important as the instrument is sometimes made forty feet in length and if each tube can be reduced ten feet in length, the lower tube being positioned thirty feet below the upper end of the casing, this reduces the total length of the three tubes thirty feet, amounting to a considerable saving in the cost of manufacture.

It will be understood that the instrument is not permanently located at any one point in the mass, but on the contrary, it is intended to be moved to any part of the mass and inserted therein, the entire mass being worked over at regular intervals to detect any rises in temperature that might result in loss or other serious trouble.

What I claim is:

1. In an instrument for indicating temperatures within a mass of loosely piled material, an elongated tubular casing having an end shaped to facilitate its insertion into the mass, an indicator housing connected to the other end of the casing and adapted for disposition exteriorly of the mass, a plurality of indicators housed therein, heat sensitive devices located within the casing at varying distances from said indicators and each operatively connected to one of said indicators.

2. In an instrument for indicating temperatures within a mass of loosely piled material, an elongated tubular casing having an end shaped to facilitate its insertion into the mass, indicator supporting means connected to the other end of the casing and adapted for disposition exteriorly of the mass, a plurality of indicators supported thereby, heat sensitive devices located within the casing at varying distances from the indicators and each operatively connected to one of said indicators.

ROBERT P. NICHOLS.